(No Model.)

N. H. VOGT.
CULTIVATOR.

No. 352,898. Patented Nov. 16, 1886.

WITNESSES:
Fred G. Dieterich
John C. Kennon

INVENTOR:
N. H. Vogt
BY Munn & Co.
ATTORNEYS.

UNITED STATES PATENT OFFICE.

NICHOLAS HENRY VOGT, OF GOFF'S, KANSAS.

CULTIVATOR.

SPECIFICATION forming part of Letters Patent No. 352,898, dated November 16, 1886.

Application filed August 12, 1886. Serial No. 210,748. (No model.)

*To all whom it may concern:*

Be it known that I, NICHOLAS HENRY VOGT, of Goff's, in the county of Nemaha and State of Kansas, have invented a new and useful Improvement in Corn-Cultivators, of which the following is a specification.

The object of my invention is to provide an improvement in the class of listed-corn cultivators which have twisted or spirally curved and inclined blades for cutting into the furrow and throwing the loosened earth toward the row of plants.

The improvement is embodied in the construction, arrangement, and combination of parts, as hereinafter described and claimed.

Figure 1:
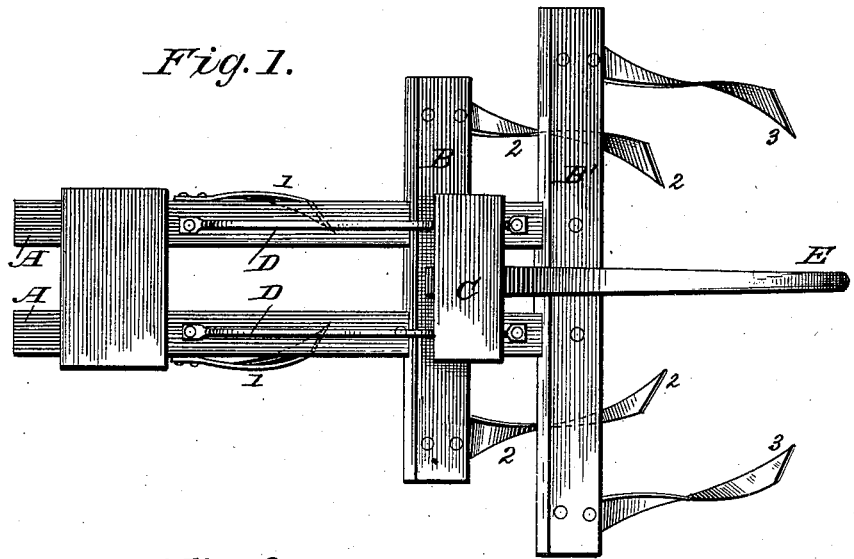
Figure 2:
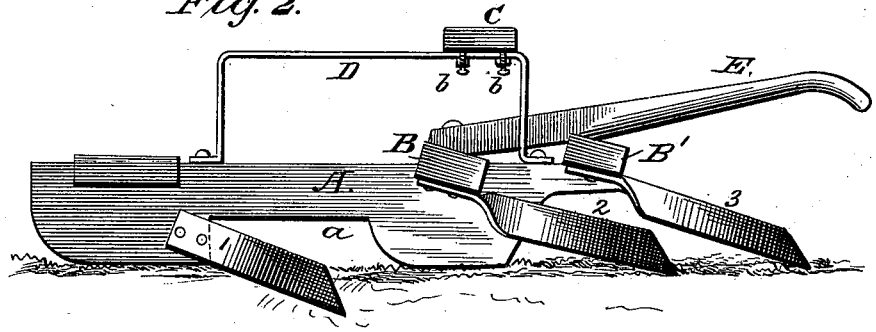

In the accompanying drawings, Figure 1 is a plan, and Fig. 2 a side view, of my cultivator.

The cultivator is designed and adapted to straddle a row of corn and cut and pulverize the soil between the rows.

The frame of my cultivator is formed, mainly, of two longitudinal parallel beams or runners, A A, and two cross-bars, B and B', which are attached to their rear ends. The beams are rounded or curved at their front ends, to adapt them to pass easily over ordinary obstructions, such as stubble, roots, clods, and small stones. The middle portion of the under or bearing surface of the runners A A is cut out, thus forming a recess, a, as shown in Fig. 2, to accommodate the cultivating-blades 1 1. The latter are thin, oblong, hardened, or steel plates. One is attached at its front end to each beam A, just in front of the recess a, and each is twisted or curved spirally inward, and also inclined downward and rearward at an angle of about thirty degrees. Their free ends thus extend inward beneath the recessed portion of the runners A, but below the plane of their bearing-surface, as shown in Fig. 2, so that the blades cut somewhat deeply into the furrows between the rows of listed corn, and also throw toward the latter a portion of the soil thus loosened. The recess a provides a space above the blades 1 1, or between them and the beams A, through which some of the loosened soil passes laterally outward over the ends of said blades, and is thus spread in the path of the rear set of blades, 2 2. Both the rear sets, 2 2 and 3 3, are nearly the same in form and general arrangement and operation as the front blades, 1 1, but are more sharply curved, and placed so as to work in a higher plane, and also at different distances from the path of the blades 1 1. In other words, the blades 2 2 are attached to the ends of cross-bar B, and the rear blades, 3 3, to the ends of the longer cross-bar B'. Blades 2 2 cut the sides, and blades 3 3 the top, of the ridges of the two corn-rows adjacent to the one being cultivated, and also work some soil inward toward the latter, or into the path of blades 1 1.

The driver's seat consists of a board, C, attached to and supported on the horizontal portions of the parallel bent rods D, whose legs are attached to the beams A A. The devices for attaching the seat C are in the nature of clamps b, which permit it to be shifted forward or back on the rods D D, to enable the driver to apply his weight where required.

A single handle, E, is attached to the cross-bars B B', for use in manipulating the cultivator.

What I claim is—

1. In a cultivator, the combination, with the beams A A and the rear cross-bars, of the inwardly-curved and downwardly-inclined blades 1 1, attached to their middle portion, and the two sets of similarly curved and inclined blades 2 2 and 3 3, which are attached to the respective cross-bars B and B', and arranged at a higher plane than said blades 1 1, and at different distances from the path of the beams, as shown and described, to operate as and for the purpose specified.

2. In a cultivator, the combination, with the runners A A and front and rear cultivating-blades, of the parallel angular seat-supporting rods, arranged as shown, the shiftable seat, and clamping devices for securing the latter, as specified.

NICHOLAS HENRY VOGT.

Witnesses:
  H. G. PICKETT,
  WILY F. REED.